United States Patent [19]

Kudoh

[11] Patent Number: 5,837,765
[45] Date of Patent: Nov. 17, 1998

[54] PHENOL RESIN MOLDING COMPOUND

[75] Inventor: Yuji Kudoh, Fukushima, Japan

[73] Assignee: NOK, Corporation, Tokyo, Japan

[21] Appl. No.: 743,556

[22] Filed: Nov. 4, 1996

[51] Int. Cl.$^6$ ...................................................... C08K 3/40
[52] U.S. Cl. .......................... 524/494; 524/594; 524/595; 524/609
[58] Field of Search .................................... 524/494, 594, 524/595, 609

[56] References Cited

U.S. PATENT DOCUMENTS

| | | | |
|---|---|---|---|
| 5,179,145 | 1/1993 | Wright | 524/147 |
| 5,185,195 | 2/1993 | Harpell et al. | 428/102 |
| 5,336,723 | 8/1994 | Ieda et al. | 525/139 |
| 5,559,179 | 9/1996 | Mori et al. | 524/494 |

FOREIGN PATENT DOCUMENTS

| | | |
|---|---|---|
| 5-311035 | 11/1993 | Japan . |
| 5-311036 | 11/1993 | Japan . |

*Primary Examiner*—Kriellion S. Morgan
*Attorney, Agent, or Firm*—Barnes & Thornburg

[57] ABSTRACT

A phenol resin molding compound which comprises phenol resin, a curing agent for the phenol resin, hydrogenated NBR, chopped strands of glass fibers and powdery glass fibers having a length of about 10 to about 200 μm has a considerably improved elongation and an elevated safely factor from cracking without any substantial lowering of the modulus of tensile elasticity.

14 Claims, No Drawings

PHENOL RESIN MOLDING COMPOUND

BACKGROUND OF THE INVENTION

1. Field of the Invention

The present invention relates to a phenol resin molding compound, and more particularly to a molding compound comprising phenol resin and fibrous materials.

2. Related Prior Art

It is the conventional practice to mix phenol resin as a molding material with chopped strands of such fibrous materials as glass fibers, carbon fibers, aramid fibers or the like, cut to a length of 1.5 to 6 mm, thereby improving the strength of molded articles.

Molded articles can be produced by injection molding, transfer molding or the like, for example, by melting a compound and passing the molten compound through a mold cavity. When there is an obstacle such as a pin, an insert or the like in the mold cavity, or when the molding is carried out by multigating, the molten resin behaves in such manner that one flowing molten resin stream is separated into a plurality of substreams at the forward end of the stream once and then joined together, and thus occurrence of weld lines is inevitable.

The strength along the weld lines formed by molding the conventional compound, particularly the strength against the tensile stress in the direction perpendicular to the weld lines, is very low. Phenol resin compounds containing chopped strands are not exceptional.

The present applicants proposed a phenol resin molding compound comprising phenol resin, a curing agent for the phenol resin, chopped strands of glass fibers and powdery glass fibers having a length of about 10 to about 200 μm as a phenol resin molding compound containing chopped strands of glass fibers for improving the weld strength of molding products (U.S. Pat. No. 5,559,179).

The proposed phenol resin molding compound satisfied the desired improvement of the weld strength of molding products, but further improvement of elongation has been desired.

SUMMARY OF THE INVENTION

An object of the present invention is to provide a phenol resin molding compound with improved elongation, which comprises phenol resin, a curing agent for the phenol resin, chopped strands of glass fibers and powdery glass fibers having a length of about 10 to about 200 μm.

According to the present invention, the phenol resin molding compound further contains hydrogenated NBR.

DETAILED DESCRIPTION OF THE INVENTION

Phenol resin for use in the present invention includes novolak resin and resol resin, where novolak resin is preferable. Novolak resin having a weight average molecular weight of about 1,000 to about 5,000 is particularly preferable. Below about 1,000, the flowability is so high that there is a fear of generation of a large amount of burrs or occurrence of burn marks due to gas generation during molding, whereas above about 5,000 the flowability is so low that molding is generally hard to carry out.

A curing agent such as hexamethylenetetramine, etc. is added to the phenol resin. That is, preferably about 10 to about 30 parts by weight of the curing agent is added to 100 parts by weight of the phenol resin.

Hydrogenated NBR for use in the present invention contains 36 to 44% by weight of combined acrylonitrile and has an iodine number of less than 28 g/100 g, preferably 4 to 28 g/100 g. When hydrogenated NBR having a larger degree of unsaturation, that is, a larger iodine number showing a degree of hydrogenation greater than 28 g/100 g, the heat resistance will be lowered. Hydrogenated NBR having an iodine number less than 4 is not commercially available and also is not economical from a viewpoint of cost. About 1 to about 15 parts by weight, preferably about 2 to about 10 parts by weight, of hydrogenated NBR is used per 100 parts by weight of phenol resin. Below about 1 parts by weight the improvement of elongation as desired in the present invention will not be attained, whereas above about 15 parts by weight the modulus of elasticity will be abruptly lowered.

Chopped strands of glass fibers for use in the present invention are strands each of about 1,000 to about 30,000 of glass fibers having a fiber diameter of 6 to 30 μm, bundled by a binder such as epoxy resin, vinyl acetate resin, etc. and cut to a length of 1.5 to 6 mm. About 5 to about 150 parts by weight, preferably about 40 to about 110 parts by weight, of the chopped strands of glass fibers are used per 100 parts by weight of the phenol resin in the same manner as so far used.

Powdery glass fibers having a length of about 10 to about 200 μm for use in the present invention are those prepared by grinding glass fibers having a fiber diameter of 6 to 30 μm to the specific length of about 10 to about 200 μm in a grinder or the like. About 50 to about 200 parts by weight, preferably about 60 to about 160 parts by weight, of the powdery glass fibers are used per 100 parts by weight of the phenol resin. When the length of the powdery glass fibers is less than about 10 μm, the overall strength will be lowered, whereas above about 200 μm the strength in the weld regions will not be improved. Below about 50 parts by weight the desired improvement of the strength in the weld regions will not be obtained, whereas above about 200 parts by weight the blendability is deteriorated, though the strength in the weld regions can be increased.

It is possible to use chopped strands and powder of carbon fibers, aramid fibers, etc. in place of the chopped strands and powder of the glass fibers, but the chopped strands and powder of glass fibers are preferable from the viewpoints of strength of molded articles and cost. Chopped strands and powders of carbon fibers, aramid fibers, etc. can be used together with those of glass fibers, so far as there is no adverse effect.

Besides the foregoing components it is also possible to use a silane-based, titanate-based or aluminum-based coupling agent for improving the bonding between the phenol resin and the glass fibers, a coloring agent, a curing promoter, a mold release agent, etc. when desired. A preferable coupling agent is an aminosilane-based coupling agent. Generally, about 0.1 to about 2 parts by weight of a coupling agent is used per 100 parts by weight of glass fibers.

The present molding compound is prepared by kneading phenol resin and hydrogenated NBR at first, then pulverizing the kneaded product, thereby obtaining a preliminary kneaded mixture, and then further kneading the preliminary kneaded mixture with other compound components, followed by cooling and pulverization by a mill-type pulverizer, etc. The thus prepared molding compound is then subjected to injection molding, transfer molding, etc.

By adding powdery glass fibers having a length of about 10 to about 200 μm to a phenol resin molding compound comprising phenol resin and chopped strands of glass fibers, the strength of weld regions of molded articles produced therefrom by injection molding, transfer molding, etc. can be improved. As a result, molded articles having weld regions produced from the present phenol resin compound have a distinguished durability even if used in a high load state or an atmosphere subject to a thermal stress. Furthermore, molded articles having weld regions inserted with a metal or the like, such as stators made from phenol resin for use in automatic speed regulators, obtained from the present phenol resin molding compound, have a good resistance to cracking.

By further adding hydrogenated NBR thereto, the elongation of weld regions can be considerable improved without lowering the modulus of elasticity. Thus, vulcanized molded articles obtained from the present phenol resin molding compound have a smaller strain at stress loading due to the higher modulus of elasticity and also a larger allowable strain due to the higher elongation, and consequently crackings (breakage) can be effectively prevented.

PREFERRED EMBODIMENTS OF THE INVENTION

The present invention will be described in detail below, referring to Examples and Comparative Examples.

EXAMPLES 1 TO 5

The following components were used to prepare phenol resin molding compounds according to the present invention:

|  | Parts by weight |
| --- | --- |
| Novolak phenol resin*[1] | 100 |
| Hexamethylenetetramine | 25 |
| Hydrogenated NBR**[2] | 2 (for Example) |
|  | 4 (for Example) |
|  | 6 (for Example) |
|  | 10 (for Example) |
|  | 15 (for Example) |
| Chopped strands of glass fibers (fiber diameter: 13 μm) | 150 |
| Powdery glass fibers (fiber diameter: 11 μm; average fiber length: 70 μm) | 75 |
| Stearic acid | 4 |
| Calcium hydroxide | 5 |
| Aminosilane-based coupling agent | 4 |

Note:
*[1]PR-29274H, a product of Sumitomo-Durets K. K., Japan
**[2]Zetpol 200L, a product of Nihon Zeon K. K., Japan The thus obtained phenol resin compounds were formed into test pieces in the shape according to ASTM D-638, Type I by injection molding at a molding condition of a cylinder temperature of 90° C., a mold temperature 175° C., an injection pressure of 800 kgf/cm$^2$, an injection time of 30 seconds and a curing time of 30 seconds.

Test pieces for determining modulus of tensile elasticity and elongation in the weld region were prepared by introducing the molten compound from both ends of the mold. Drawing tests for determining the tensile strength were carried out according to ASTM D-638.

Results of determination are given in Table 1.

TABLE 1

| Example No. | Modulus of tensile elasticity (kgf/mm$^2$) | Elongation (%) |
| --- | --- | --- |
| 1 | 2120 | 0.89 |
| 2 | 2080 | 0.91 |
| 3 | 2010 | 0.91 |
| 4 | 1900 | 0.88 |
| 5 | 1770 | 0.75 |

Comparative Example 1

No hydrogenated NBR was used in Example 3.

Comparative Example 2

No powdery glass fibers were used in Example 3.

Comparative Example 3

Neither hydrogenated NBR nor powdery glass fibers were used in Example 3.

Modulus of tensile elasticity and elongation in the weld regions of injection molded test pieces obtained from the phenol resin molding compounds of Comparative Examples 1 to 3 were determined in the same manner as in Examples 1 to 5. The results are shown in Table 2.

TABLE 2

| Com. Ex. No. | Modulus of tensile elasticity (kgf/mm$^2$) | Elongation (%) |
| --- | --- | --- |
| 1 | 2120 | 0.72 |
| 2 | 1700 | 0.80 |
| 3 | 2330 | 0.37 |

Safety factors (maximum load expecting in using molded product) from crackings in molded test piece models were calculated and found to be 1.7 for Example 1 and 1.3 for Comparative Example 1, but cracking for Comparative Example 3.

What is claimed is:

1. A phenol resin molding compound which comprises a novolak phenol resin having a weight average molecular weight of 1,000 to 5,000, a curing agent for the novolak phenol resin, hydrogenated NBR, chopped strands of glass fibers and powdery glass fibers having a length of about 10 μm to about 200 μm.

2. A phenol resin molding compounding according to claim 1, wherein the curing agent for the novolak phenol resin is hexamethylenetetramine.

3. A phenol resin molding compound according to claim 2, wherein about 10 to about 30 parts by weight of the hexamethylenetetramine is used per 100 parts by weight of the novolak phenol resin.

4. A phenol resin molding compound according to claim 1, wherein the hydrogenated NBR contains 36% to 44% by weight of acrylonitrile and has an iodine number of 4 g/100 g to 28 g/100 g.

5. A phenol resin molding compound according to claim 4, wherein about 1 to about 15 parts by weight of the hydrogenated NBR is used per 100 parts by weight of the novolak phenol resin.

6. A phenol resin molding compound according to claim 1, wherein the chopped strands of glass fibers are glass fibers having a fiber diameter of 6 μm to 30 μm, bundled with a resin binder and cut to a length of 1.5 mm to 6 mm.

7. A phenol resin molding compound according to claim 1, wherein about 5 to about 150 parts by weight of the chopped strands of glass fibers are used per 100 parts by weight of the novolak phenol resin.

8. A phenol resin molding compound according to claim 1, wherein about 50 to about 200 parts by weight of the powdery glass fibers having a length of about 10 μm to about 200 μm were used per 100 parts by weight of the novolak phenol resin.

9. A phenol resin molding compound according to claim 1, wherein chopped strands or powder of carbon fibers or aramid fibers are used together with the chopped strands of glass fibers and the powdery glass fibers.

10. A phenol resin molding compound according to claim 1, further comprising a coupling agent.

11. A phenol resin molding compound according to claim 10, wherein the coupling agent is an aminosilane-based coupling agent.

12. A phenol resin molding compound according to claim 11, wherein about 0.1 to about 2 parts by weight of the coupling agent is used per 100 parts by weight of the glass fibers.

13. A molded article having a weld region, molded from a phenol resin molding compound which comprises a novolak phenol resin having a weight average molecular weight of 1,000 to 5,000, a curing agent for the novolak phenol resin, hydrogenated NBR, chopped strands of glass fibers and powdery glass fibers having a length of about 10 μm to about 200 μm.

14. A molded article according to claim 1, wherein the molded article is a stator made from phenol resin having an insert molded or post-inserted metallic outer race.

* * * * *